METHOD OF THERMOGRAPHIC REPRODUCTION WHEREIN A VAPORIZABLE CONDITIONER CHANGES THE PHYSICAL CHARACTERISTICS OF A CONVERSION SHEET COATING

Filed Aug. 1, 1963 2 Sheets-Sheet 1

INVENTORS
WALTER S. MARX, JR.
CHARLES P. COLLIER
BY
Horton, Davis, Brewer & Brugman
Attys.

METHOD OF THERMOGRAPHIC REPRODUCTION WHEREIN A VAPORIZABLE CONDITIONER CHANGES THE PHYSICAL CHARACTERISTICS OF A CONVERSION SHEET COATING

Filed Aug. 1, 1963 2 Sheets-Sheet 2

INVENTORS
WALTER S. MARX, JR.
CHARLES P. COLLIER
BY
Horton, Davis, Brewer & Brugman
ATTYS.

United States Patent Office 3,210,544

Patented Oct. 5, 1965

3,210,544

METHOD OF THERMOGRAPHIC REPRODUCTION WHEREIN A VAPORIZABLE CONDITIONER CHANGES THE PHYSICAL CHARACTERISTICS OF A CONVERSION SHEET COATING

Walter S. Marx, Jr., and Charles P. Collier, Santa Barbara, Calif., assignors to Printing Arts Research Laboratories, Inc., Santa Barbara, Calif., a corporation of Delaware Filed Aug. 1, 1963, Ser. No. 299,401
21 Claims. (Cl. 250—65)

Figures 1, 2, 5:
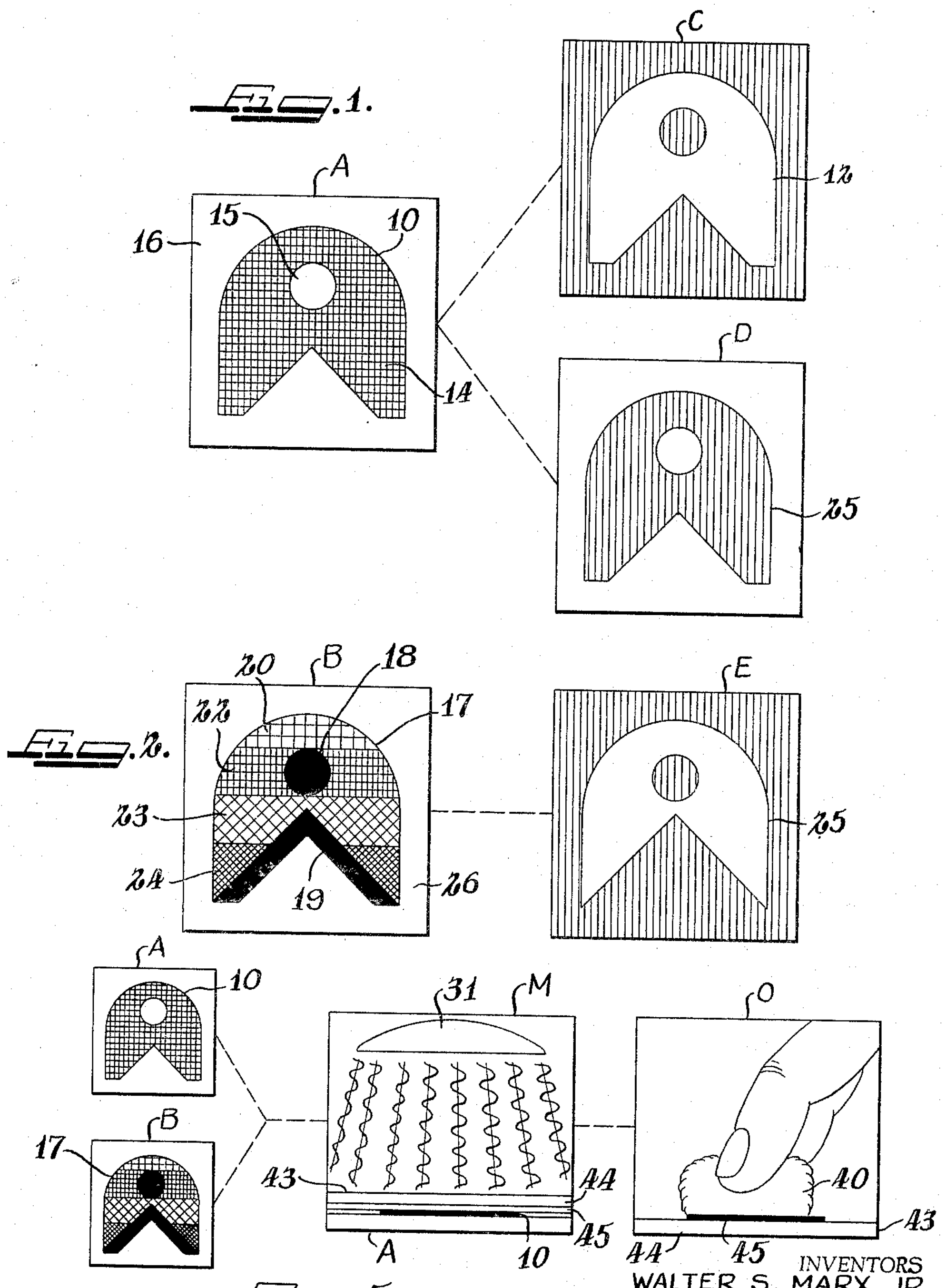

This invention relates to a method for the transfer of graphic images in either negative or positive form for use in the production of press plates for lithographic, letterpress and gravure printing, and more particularly to such a method wherein selective heat induced vaporization of a vaporizable substance and resulting from exposure to infrared radiation is utilized for effecting a distinction between image and non-image areas in the transfer of the graphic image from a subject to a conversion sheet suitable for producing press plates.

The method of this invention is a related phase or species of that disclosed in our copending application Serial No. 276,951, filed April 30, 1963 for Method for Transfer of Graphic Images.

One of the objects of this invention is to provide a method for the transfer of graphic images, in which method a preestablished subject has image and non-image areas distinguished by the incorporation in one of said areas of an infrared-absorbing material and by having the other of said areas contain little or no infrared-absorbing material, whereupon such areas will be selectively heated by exposure to infrared radiation, and which method makes use of such selective heating and the effects thereof for producing selective vaporization of a vaporizable substance in areas corresponding spatially and dimensionally to those of said areas which incorporate an infrared-absorbing material.

Another object of our invention is to provide a method for the transfer of a graphic image from a subject to a vapor-permeable coating on a conversion sheet, which method utilizes heat induced vaporization of a vaporizable substance for effecting the transfer of such substance from image definitive areas of the subject to the vapor-permeable coating on the conversion sheet, which coating is affected by said vaporizable substance to change the characteristics of the coating, so that it is readily separable from the rest of the coating and removable from the conversion sheet in areas conforming dimensionally and spatially to the said graphic image.

More specifically, this invention has within its purview the incorporation into the original subjpect of image definitive areas which are distinguished from one another by the inclusion and practical elimination of material absorptive of infrared radiation and the selective discrimination between such areas by the exposure thereof to infrared radiation to effect heating and vaporization from the one of said areas which includes the absorber of infrared radiation of a vaporizable substance which is transferable to a vapor-absorptive coating on a conversion sheet to change the characteristics of the portion or portions of said coating to which it is transferred in such a way that the coating is prepared for removal.

In one phase of the method herein disclosed, this invention comprehends the distinction between image and non-image areas of a subject by the inclusion in one of the areas of an infrared absorbing material and the practical elimination of such materials from the other areas thereof, so that a substantially uniform layer of a vaporizable substance utilized to cover the subject will be selectively heated upon exposure of the subject to infrared radiation to vaporize the vaporizable substance and transfer it to a vapor-penetrable coating on a conversion sheet in a pattern conforming dimensionally and spatially to the areas including the infrared absorbing material.

Another phase of our invention includes the incorporation of a vaporizable conditioner in a coating of a conversion sheet and the use of infrared absorbent material in image defining areas of a graphic subject, so that close contact exposure of the subject to infrared radiation through said coating and conversion sheet heats, vaporizes and practically eliminates the vaporizable conditioner from areas of the conversion sheet coating corresponding dimensionally and spatially to those of the subject which contain the infrared absorbent, whereupon such image defining areas of the conversion sheet coating are differentiated from other areas and rendered effectively resistant to removal from the conversion sheet.

In another aspect, this invention has within its purview the transfer to a subject of a vaporizable conditioner for a coating of a conversion sheet by the inclusion in the subject of infrared absorbing material for distinguishing image from other areas of the subject and the heating of the subject while it is in close contact with a surface containing a vaporizable conditioner, whereupon such vaporizable conditioner is transferred to the subject and is subsequently transferable by selective vaporization to the coating of a conversion sheet to change the characteristics of such image areas of the conversion sheet to render the coating readily separable from other areas and removable from the sheet.

This invention further contemplates within its scope the transfer to a conversion sheet of a graphic image defined in the subject area by infrared-absorbing material of a relatively uniform overall subject coating of a vaporizable substance suited to the conditioning of a coating on a conversion sheet, so that by exposure of the subject to infrared radiation while in close contact with the coating of the conversion sheet, the selective heating of said subject area will effect vaporization of the vaporizable substance and transfer thereof from the subject to the coating on the conversion sheet in dimensional and spatial relationship to the subject, thereby rendering the conditioned area of the conversion sheet coating subject to separation from other areas of the coating and removable from the conversion sheet in dimensional and spatial relationship to the graphic image of the subject.

As another specific aspect of this invention, it incorporates the inclusion in particular and defined image areas of a subject of a material which is absorbent of infrared radiation and also a vaporizable substance suitable to the conditioning of a coating on a conversion sheet, so that by exposure to infrared radiation while in close contact with the coating on the conversion sheet, the vaporizable substance in the image areas will be transferred by vaporization in dimensional and spatial relationship to the subject image areas to render the coating of the conversion sheet separable from other areas of the coating and removable from the conversion sheet.

Figures 3, 4:
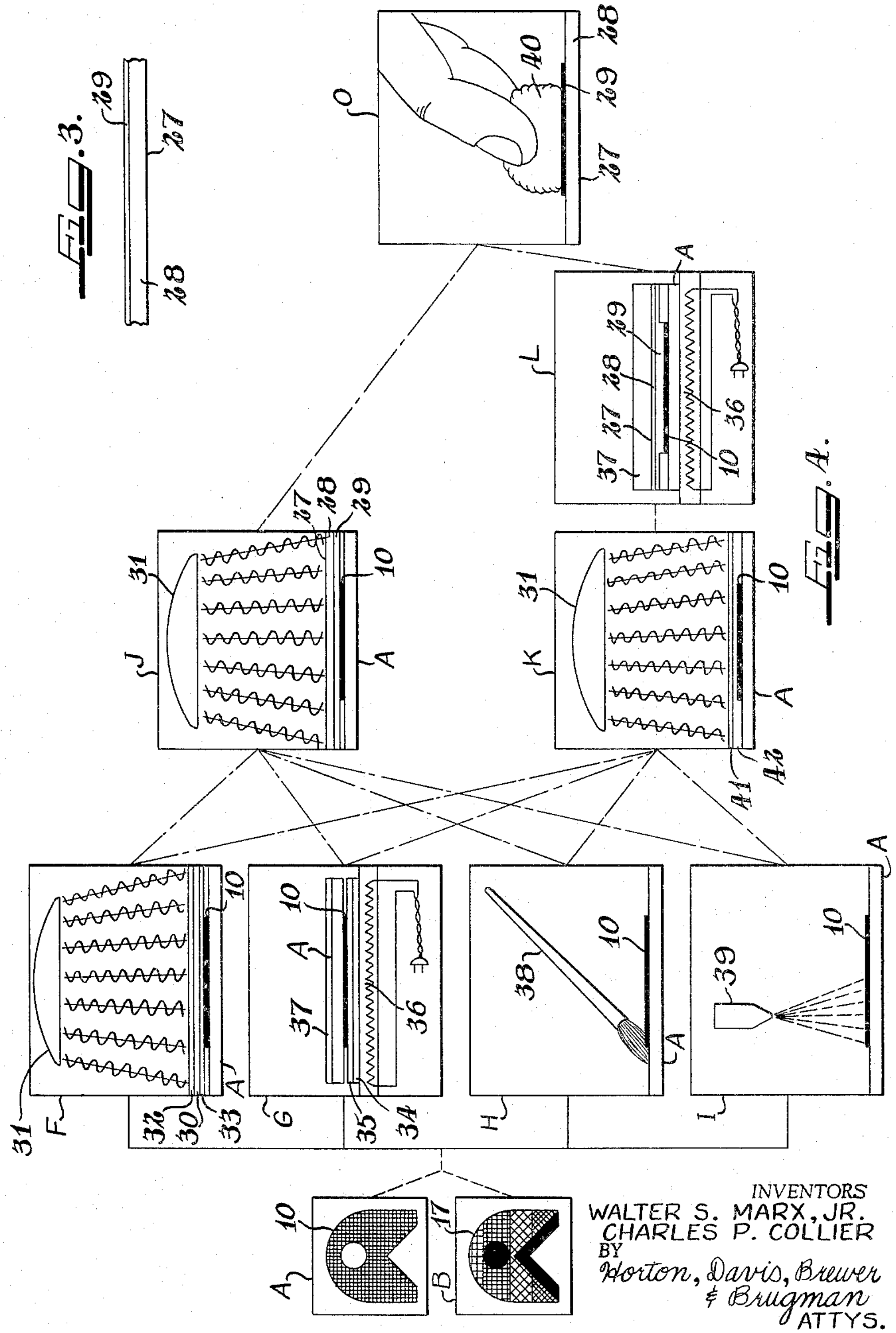

Other objects and advantages of the invention will be apparent from the following description taken in conjunction with the accompanying drawings in which:

FIGS. 1 and 2 are illustrative diagrammatic views depicting two types of subjects including exemplary graphic images and types of reproducible graphic images which are obtainable therefrom by the method of this invention;

FIG. 3 is a schematic illustration, in side elevation of one of the instrumentalities, namely a conversion sheet, utilized in carrying this disclosed method into effect and which constitutes a base sheet having adhered to one surface thereof a disruptable coating; and FIGS. 4 and 5 are diagrammatic illustrations showing steps and alternative steps which may be used in the method herein disclosed for obtaining the reproducible graphic images from subjects.

The method of this invention contemplates, in addition to the selective use of infrared absorbent material in portions, areas or segments of a subject containing a delineated image and the use of infrared radiation for effecting selective heating of areas, portions or segments of the subject, the use of three additional instrumentalities, namely, a conversion sheet, a vaporizable coating conditioner and a clearant, which are compatible and coactive through the steps of this method for achieving the production of a conversion sheet which carries an image of a specifically defined and preestablished subject suited to graphic reproduction.

In connection with the use of infrared absorbent materials, it is pointed out that not all visibly colored or black areas of a delineated image are necessarily strongly absorbent of infrared radiation. Thus a delineated image of a subject may embody visibly discernible segments or areas which may be distinguished from other segments or areas of the image for the purposes of this method by the inclusion therein or the elimination therefrom of a material strongly absorbent of infrared radiation, as will be more fully pointed out herein.

The conversion sheet, upon which the image of a subject is produced for transfer purposes, fundamentally constitutes a base sheet of a dimensionally stable material which is pervious or transparent to light in a relatively wide spectral range including both infrared and ultraviolet radiation, such as polyester or polystyrene film, and which is also inert to, and non-absorptive or non-penetrable by materials used in carrying out the process steps of the invention for producing an image thereon. Although used in different ways, the conversion sheet utilized in this method is quite similar in type and in some respects to that disclosed in our copending application Serial No. 115,285 for Softenable Film Material and Method of Using Same, filed June 7, 1961, now Patent No. 3,104,175. The base sheet has thereon and adhered thereto a substantially uniform and normally stable but disruptable coating having light transmissive characteristics different than those of the base sheet as a result, for example, of being colored or containing an absorbent of ultraviolet light, or both. The coating is also either coactive with a vaporizable coating conditioner which is transferred thereto, or is changeable in characteristic by the vaporization therefrom of a conditioner present therein, to alter the characteristics of portions of the coating to render those portions susceptible or resistant to the action of a clearant for completing the disruption along sharply and clearly defined lines and the removal from the base sheet of the portion of the coating in which the conditioner is present or to which the said conditioner has been transferred in vaporized form, as distinguished from the contiguous portions of the coating in which the conditioner is absent in any appreciable amount; the portions of the coating in which the conditioner is absent being virtually unaffected by the clearant or the disrupted film portions removed thereby. Furthermore, the film coating on the base sheet is so thin that the conditioner penetrates and comingles therewith to the full depth of the coating or is vaporized therefrom without spreading laterally of the coating to any appreciable extent.

The vaporizable coating conditioner to which reference has been made is either embodied in the coating as initially used and vaporizable to substantially eliminate it therefrom or penetrates and comingles with a portion of the coating to which it is transferred from a subject when not initially present therein to alter the characteristics of that portion of the coating. When present in the coating and not vaporized therefrom or when transferred thereto, the conditioner facilitates the separation and removal of that portion of the coating from contiguous portions thereof and from the base sheet. When not embodied in the coating, the conditioner may be in any one of several normal states for initial use, and when in such state, as in a liquid or finely divided solid form or other relatively inactive and vaporizable form for transfer to the coating by vaporization to accomplish its intended purpose within a reasonable time, within which it is effective for accomplishing the desired results. In penetrating or being absorbed into the coating and in comingling therewith, or when embodied therein, the conditioner affects the characteristics of the coating so as to render it disruptable and facilitates the separation thereof from contiguous coating portions along sharply and clearly defined lines, as well as reducing adhesion of the coating to the base sheet, so that such coating is removable therefrom. The presence of the conditioner further renders the coating susceptible to the action of a clearant which will not appreciably affect the areas of the coating which have not received the conditioner or from which the conditioner has been substantially removed by vaporization. It is to be understood that the function of the conditioner is to render selected and defined portions or areas of the coating disruptable and separable from contiguous portions of the coating along sharply and cleanly defined lines and to render the areas affected thereby completely removable from the base sheet with the aid of a clearant which does not coact appreciably with the portions or areas of the coating in which the conditioner is not present in an appreciable amount.

The clearant utilized in the method of this invention is a liquid which is not coactive or reactive with, or effective to produce ready and quick removal of the coating which does not have an appreciable quantity of conditioner present therein and at normal temperatures of use. However, when the coating has been rendered disruptable and removable from the base sheet by the presence therein of a compatible conditioner, then the clearant liquid having the aforesaid characteristics becomes effective for completing the coating removal operation.

Time and temperature considerations are two factors which separately and jointly have some bearing upon the selections and operations of the aforementioned instrumentalities in conjunction with the method of this invention. For example, at least some commercial uses of the method either demand or make it desirable that a conversion sheet bearing an image of a subject, which image bearing conversion sheet is the end product of the disclosed method, should be producible in usable condition very rapidly, for example, in two minutes or less, when the method steps are carried out without delays therebetween. Although not necessarily requiring rapid sequences of steps, this method affords capabilities of the production of excellent results in even much less than the two minutes mentioned.

When, as in the herein disclosed method, heat is utilized for effecting the transfer of the vaporizable conditioner to or from the coating of the conversion sheet, both close contact between the subject and the coating and a relatively short period of heating for effecting the transfer of the conditioner to or from the conversion sheet coating, are desirable in order to avoid, or at least minimize diffusion of the conditioner in effecting the transfer. Such transfer of conditioner at temperatures within a working range for good results can be made with heating times varying from fractions of seconds up to several minutes, depending upon the particular coating, conditioner and heating method utilized therewith.

Having thus, at least generally, defined the instrumentalities and their characteristics which are utilized for carrying out the steps of the method herein disclosed, as well as the terminology utilized for making references to the instrumentalities, the steps of the method, as such, may be more readily understood; it being further understood that specific examples of both the instrumentalities and the method steps of the invention shall be set forth herein, more definitely to characterize exemplarly embodiments thereof which are set forth for illustrative purposes.

Thus, in one of its aspects, the method of this invention comprehends the transfer to a portion or area of the disruptable coating of a conversion sheet, in a specifically defined and preestablished image delineating pattern and by any one of several alternative ways expedient to effecting the desired end result from particular initial subjects, of a vaporizable coating conditioner which renders one said portion or area of the coating disruptable and removable from the base portion or area of the conversion sheet along sharply and clearly defined lines, whereupon the portion or area affected by the coating conditioner is readily disruptable and removable from the base portion of the conversion sheet along the aforementioned sharply and clearly defined lines with the aid of a clearant, thereby to leave one the base sheet, and otherwise intact, an image delineating coating definitive of the said pattern transferred thereto and usable for reproduction purposes in the graphic arts.

In another aspect of the method, as herein disclosed, this invention has within its purview the use of a conversion sheet having a vaporizable conditioner distributed throughout the coating as initially prepared and the substantial elimination of such conditioner, in a specifically defined and preestablished image delineating pattern, from areas of the coating, thereby to leave those areas of the coating from which the conditioner is not substantially eliminated subject to disruption and removal from the base sheet by the application of clearant. In this instance, those coating areas from which the conditioner is substantially eliminated are rendered resistant to the action of the clearant and remain unaffected thereby.

Having reference to the accompanying drawings, wherein exemplary phases and steps of this method are schematically and diagrammatically depicted for illustrative purposes, FIG. 1 is representative of a subject A embodying a delineated image 10 which may be pictorial, typographical or made up of indicia or combinations thereof and which is subject to reproduction in a single medium, such as by line or halftone processes. C and D are representative of finished image bearing conversion sheets obtainable from subject A by following alternative steps of the method herein disclosed, as will be more fully pointed out; it being notable that in conversion sheet C reproduced image 12 of the subject image 10 is a negative representation, while on conversion sheet D, the reproduced image 13 is a positive representation of the subject image 10.

Subject A, in its adaptation to the method herein discosled, has the cross-hatched area 14 thereof distinguished from additional or background areas 15 and 16 of the subject by the inclusion in either the cross-hatched area or the additional or background areas thereof an absorbent of infrared radiation, while the other is relatively non-absorptive of such infrared radiation. That is, the cross-hatched area 14 of the subject image may, for example, be either a line drawing, a typographical image or indicia, or combinations thereof rendered on paper or on an artist's board with a pigment or ink which is absorbent of infrared radiation, while the paper or artist's board is relatively non-absorptive of the infrared radiation and reflective thereof, so that upon exposure to such infrared radiation, the area or areas containing the absorbent of infrared radiation will be heated, while the other areas will be relatively unaffected.

As has been previously mentioned, visually discernible image areas suited to purposes of photographic reproduction need not necessarily be rendered in a medium which is absorptive of infrared radiation. Subject B in FIG. 2 is exemplary of one embodying an image 17 which incorporates segments 18 and 19 suited to solid line reproduction wherein no dot pattern should be present, while segments 20, 22, 23 and 24 require halftone reproduction as, for example, such segments rendered in various shades of gray. In this instance, and for the purpose of producing a conversion sheet E including a negative reproduced image 25 of segments 20, 22, 23 and 24 of the subject image 17 which are adapted to halftone reproduction, and which conversion sheet is adapted to use as a mask which serves a useful function in the production of a halftone negative, the segments 20, 22, 23 and 24 of the subject image 17 may be distinguished from the segments 18 and 19 as well as the additional or background areas 26 by the inclusion therein of a material which is absorbent of infrared radiation. In this instance, the subject is rendered on an artist's board, for example, which is relatively non-absorptive of infrared radiation and the segments 18 and 19 which are subject to reproduction without dot pattern are rendered with a visually and photographically discernible material which is relatively non-absorptive of infrared radiation.

As has been indicated, a purpose of the method of this invention is to achieve the production of a conversion sheet which carries an image of specifically defined and preestablished subject suited to graphic reproduction or to use as a mask for facilitating graphic reproduction. As also indicated, an instrumentality adapted to use in carrying the method into effect is a conversion sheet 27 which is illustrated in FIG. 3. This conversion sheet includes a base sheet 28 preferably of a dimensionally stable material, such as polyester or polystyrene film preferably having a thickness of approximately 0.003″ and which is transparent to light in a relatively wide spectral range, including both infrared and ultraviolet radiation. The base sheet 28 has adhered thereto a relatively thin coating 29, which coating is normally sufficiently hard to resist scratching and abrasion in normal use, as well as being capable of being rendered disruptable by the action of a conditioner and a clearant which are compatible therewith.

FIGS. 4 and 5 are illustrative flow diagrams depicting exemplary steps and variations of steps adapted to use in the method of this invention for obtaining finished conversion sheets, such as C, D or E, carrying reproduced images of specifically defined and preestablished subjects, such as A or B; the reproduced images conforming spatially and dimensionally to the reproducible portions of subject images 10 or 17.

Having a subject, such as A or B, prepared with image and other areas thereof differentiated by the inclusion in one of an absorbent of infrared radiation, and in accordance with the illustrative chart of FIG. 4, the next step of the method, under this modification of the invention, is to apply to the entire image bearing surface of the subject a relatively uniform stratum or layer of a vaporizable conditioner which is compatible with the conversion sheet which is to be used therewith for rendering the areas of the conversion sheet coating to which it is transferred disruptable and removable with the aid of a clearant. As indicated in FIG. 4, four alternative illustrative ways are disclosed herein for effecting the application of the vaporizable conditioner to the image surface of the subject which is to be reproduced.

As diagrammatically illustrated at step F on the flow chart of FIG. 4, the desired uniform stratum or layer of vaporizable conditioner is applied to the image bearing surface of the subject with the aid of a sheet 30 of porous material, such as short-fiber paper, having a thickness of approximately 0.001″, which sheet has on one surface thereof a relatively uniform coating 32 of an infrared absorbent material, such as black-pigmented ink applied by conventional printing. The opposite surface of the sheet 30 has thereon a relatively uniform and continuous coating 33 of the vaporizable conditioner which is compatible with the coating of the conversion sheet which is to be used. The surface of the sheet 30 which carries the coating 33 of vaporizable conditioner is placed against the image bearing surface of the subject A, so that the infrared absorbent surface thereon is exposed. While maintained in contact with the subject, the infrared absorbent surface 32 is irradiated with infrared radiation from an infrared source 31, such as a quartz infrared lamp having a rating of 1350 watts operated at 280–300 volts, as for example, in a Model 47 Thermo-Fax copying machine made by Minnesota Mining and Manufacturing Company of St. Paul, Minnesota.

The sheet 30, prepared in the manner described with a layer of infrared absorbent material thereon and carrying a suitable vaporizable conditioner may be termed a "charge sheet." The irradiation of the sheet in the manner described and while in contact with the image bearing surface of the subject produces sufficient heat to sublime or vaporize the vaporizable conditioner and to effect the transfer of vaporized conditioner to the image bearing surface of the subject, where the conditioner condenses upon cooling to provide a substantially continuous and uniform stratum thereof on the subject surface.

A second method of applying a relatively uniform stratum of a vaporizable conditioner to the image bearing surface of a subject is schematically illustrated in step G of the diagram of FIG. 4. As illustrated in step G, a sheet 34 of a relatively porous material, such as a short-fiber paper having a thickness of approximately 0.001" has thereon a relatively uniform and continuous coating 35 of a vaporizable conditioner suitable for use with the conversion sheet which is to be used. In contrast to the charge sheet used in step F, the charge sheet of step G does not necessarily include a coating of infrared absorbent material. In step G, the sheet 34 is placed on a relatively uniformly heated platen 36 with the conditioner coated surface thereof facing away from the platen surface. The image bearing surface of the subject A is placed against the conditioner coated surface of the charge sheet and is desirably held in close contact therewith by a flat weighted surface, such as a sheet of glass 37. While thus disposed, the platen is heated for a suitable period to effect vaporization of the vaporizable conditioner and the resultant transfer thereof from the surface of the charge sheet to the image bearing surface of the subject. This provides a relatively uniform coating of the conditioner over the entire image bearing surface of the subject, whereon the conditioner condenses upon cooling.

Step H of the diagram of FIG. 4 affords another manner of applying a coating of vaporizable conditioner to the image bearing surfaec of a subject. In this step, the vaporizable conditioner is in the form of a powder, and is, for example, ground to a size which will pass through a 100-mesh screen. For the use of the powdered conditioner, the subject image is desirably on a material, such as non-gloss paper, having microscopic roughness which will retain and provide for a well distributed layer of the powder when applied thereto and distributed by means, such as a brush 38. Excess conditioner, if desirable, may be removed from the surface after brushing, by wiping the surface with a soft material, such as a cleansing tissue. The wiping action further tends to distribute the finely divided conditioner and produce an effectually continuous layer over the entire image bearing surface of the subject. Although the applied powder does not form a completely homogeneous and continuous coating and is distributed in minutely discrete particles, the subsequent vaporization thereof in use tends to fill in intervening spaces and to produce a more truly, if not entirely, continuous layer of the conditioner vapor over heated areas of the subject.

As depicted in step I of the chart of FIG. 4, the vaporizable conditioner is produced in solution or in liquid form and is sprayed from a nozzle 39 onto the image bearing surface of the subject so as to produce a relatively uniform and continuous layer of the conditioner on the surface of the subject. In such an adaptation, the vaporizable conditioner may be dissolved in a volatile liquid carrier, whereupon after the conditioner is applied to the subject, the volatile liquid carrier evaporates, leaving the vaporizable conditioner on the subject surface.

After the conditioner has been applied to the subject, as in one of the ways illustrated in steps F, G, H and I and as described in connection therewith, there are alternative ways in which the treated subject may be utilized to continue the method to its end result, as indicated in steps J and K of the chart of FIG. 4. As shown in step J, the image bearing surface of the conditioner treated subject is placed in intimate contact with the coating 29 on the conversion sheet 27, and while thus disposed, the subject is irradiated by infrared radiation from the source 31 for a predetermined period of time which is sufficient to heat the areas of the subject containing an infrared absorbent material and to effect vaporization of the vaporizable conditioner in those areas, whereby vaporizable conditioner from the areas containing the infrared absorbent is transferred to the coating of the conversion sheet in spatial and dimensional conformity to image delineating areas of the subject. From this it may be understood that even though the entire image bearing surface of the subject carries vaporizable conditioner, the distinguishing of the image delineating areas of the subject from other areas thereof by the inclusion in one of an infrared absorbent makes possible the selective transfer of conditioner to image delineating areas of the conversion sheet coating in conformity to the subject image by the irradiation of the entire subject through the conversion sheet and its coating, both of which transmit the infrared radiation to the image bearing surface of the subject.

In the transfer of vaporized conditioner from the subject to the conversion sheet coating, the conditioner penetrates and comingles with the conversion sheet coating to change the characteristics of the portions of the coating to which it is transferred, and renders them disruptable and removable from the base sheet upon the application of a clearant to the conversion sheet coating. Thus, after separation of the irradiated conversion sheet from the subject, clearant is applied to the coating surface, as indicated by step O of the chart in FIG. 4. As there indicated, one effective manner of applying the clearant to the conversion sheet coating 29 is to saturate a soft swab 40 of cotton or tissue with a clearant liquid, after which the entire surface of the coating is manually swabbed with the clearant liquid to effect disruption of the conditioner treated portions of the coating and the removal of such conditioner treated portions from the base sheet 27. After drying, this leaves a conversion sheet bearing a reproduced delineated image of the type shown in FIG. 1 at C, D or E.

In the modified method step depicted in step K of the chart of FIG. 4, the image bearing surface of the subject which carries a stratum 42 of the vaporizable conditioner applied in one of the manners of steps F, G, H or I, is covered by an infrared transmissive paper discharge sheet 41 and is irradiated by infrared radiation from the source 31 through the discharge sheet for a time sufficient to effect vaporization of practically all of the vaporizable conditioner from the image delineating area of the subject which embodies the vaporizable conditioner and the transfer thereof to the discharge sheet. Thus, by this method, the vaporizable conditioner is effectively discarded from the image delineating area of the subject which embodies the infrared absorbent, while leaving at least a substantial portion of the vaporizable conditioner in the surface areas of the subject which do not include the infrared absorbent.

After treatment as prescribed in step K, the discharge sheet is removed and the treated subject is placed on a heating element, such as an electrically heated platen 36, with the image bearing surface of the subject facing upwardly from the platen. Then, the coating 29 of the conversion sheet is placed against the image bearing surface of the subject and held in intimate contact therewith by a weighted flat surface, such as the sheet of glass 37. While thus disposed, the platen is heated for a predetermined period to vaporize the vaporizable conditioner from the areas of the subject from which it was not vaporized in step K. This effects the transfer of vaporizable conditioner from image delineating areas of the subject to the conversion sheet coating to prepare that coating for disruption and removal in conformity with image delineating areas of the subject, as described herein in respect to step O.

In connection with the method steps and alternatives which are illustrated and described in connection with the chart of FIG. 4, it is to be understood that these steps are adapted to be used wtih subjects of the type indicated in either A or B. In either instance, the resultant image produced on the conversion sheet may be either positive or negative, as desired, depending upon whether the subject image or other areas or segments thereof contain the infrared absorbent, and also whether the alternatives of steps J or K are followed to continue the method to its conclusion. In connection with the alternatives of steps J and K, it may be understood that the results differ for like steps, because in one the vaporizable conditioner is transferred directly to the conversion sheet coating from the portion of the subject containing the infrared absorbent material, while in the other the vaporizable conditioner is vaporized from the areas containing the infrared absorbent material and is effectively discarded to leave the conditioner to be transferred from areas of the subject other than those containing the infrared absorbent.

In the modification of the method illustrated in the chart of FIG. 5, the subjects may be of the type of subjects A or B, and the general structure of the conversion sheet is like that illustrated in FIG. 3. However, in this instance, the vaporizable conditioner is incorporated in the coating of the conversion sheet when it is initially manufactured or prepared for use. Thus, in its unused form, the conversion sheet coating is entirely susceptible to the action of clearant and is entirely disruptable and removable from the base sheet. Thus, instead of being susceptible to the action of the vaporizable conditioner for changing the characteristics of the coating to render it disruptable and removable, the conversion sheet utilized in the modified method of FIG. 5 has a coating thereon, the characteristics of areas of which are changed in use by the vaporization of the conditioner therefrom.

As depicted in step M of FIG. 5, a conversion sheet 43 comprises a base sheet 44, the material and characteristics of which are like those of the conversion sheet described in connection with FIG. 3. The base sheet 44 has adhered thereto a coating 45 which embodies a vaporizable conditioner. As in the previously described modification of this method, image delineating and other areas of the subject are differentiated by the inclusion in one of them of a material which is absorbent of infrared radiation, while the other is relatively non-absorbent thereof. In use, and as schematically illustrated in step M of FIG. 5, the coating 45 of the conversion sheet 43 is placed in intimate contact with the image bearing surface of the subject. In this position, the subject is irradiated with infrared radiation from the source 31 with the radiation passing through the base sheet and the coating. The timing of the irradiation and temperature produced thereby are predetermined to vaporize conditioner from areas of the coating which correspond dimensionally and spatially to the image delineating areas of the subject which include the infrared absorbent material. Such vaporization transfers the conditioner from the coating in the aforesaid image delineating areas to the subject, whereby the substantial depletion of the conditioner from those areas of the conversion sheet coating renders those coating areas practically insusceptible to the action of the clearant, while leaving the other areas susceptible thereto. To complete the conversion sheet with the image transferred thereto, it is separated from the subject and treated in accordance with the procedure of step O of the method previously described by the application of clearant thereto.

From the drawings and the description thus far presented, it may be understood that the method herein disclosed constitutes a method of making a reproducible image from a preestablished subject wherein image defining and other areas of the subject are differentiated by the inclusion in one of such areas of a material which is absorbent of infrared radiation while the other is relatively non-absorbent of infrared radiation, and the use therewith of a source of infrared radiation, a conversion sheet having a thin disruptable coating adhered to a base sheet and which coating and base sheet are transmissive of visible light and radiation in the infrared and ultraviolet spectrum ranges, a vaporizable conditioner which, by its presence in the conversion sheet coating renders the coating disruptable and removable from the base sheet, and a clearant which facilitates the disruption and removal from the base sheet of the coating areas in which conditioner is present, while leaving the remainder of the coating intact. In all aspects, the method of this invention is characterized by the selective vaporization of a vaporizable conditioner by the utilization of infrared radiation and a subject in which image defining and other areas are distinguished in one of such areas by an infrared absorbent material.

In two of the more specific aspects, the vaporizable conditioner is applied in one of a plurality of ways to the image bearing surface of the subject to form a relatively uniformly distributed and continuous stratum of the conditioner over the entire image bearing surface. Then, in one of the two aforementioned more specific aspects, the subject is irradiated by infrared radiation through the conversion sheet while the conversion sheet covers the image bearing surface of the subject with the coating on the conversion sheet in contact with the surface, thereby to effect vaporization of the conditioner from the areas of the subject containing the infrared absorbent material and the transfer of such vaporized conditioner from the subject to areas of the conversion sheet coating in spatial and dimensional conformity to the subject areas containing the infrared absorbent material.

In the second of the two more specific aspects, the image bearing surface of the subject which has thereon a stratum of vaporizable conditioner is covered by a sheet of infrared transmissive paper which serves as a discharge sheet and is irradiated with infrared radiation for a time sufficient to vaporize the conditioner from the subject areas containing infrared absorbent material and to effect the transfer of such vaporized conditioner to the discharge sheet. Thereafter, the image bearing surface of the subject is covered by a conversion sheet with the conversion sheet coating in intimate contact with such subject surface and the entire surface of the subject is heated, as on a platen, to vaporize the conditioner remaining thereon and transfer it to areas of the conversion sheet coating corresponding spatially and dimensionally to those of the subject which do not contain a material absorbent of infrared radiation.

In a third specific aspect of this method, the vaporizable conditioner is incorporated in the entire coating of the conversion sheet as prepared in its usable form. The subject, in this instance, does not carry any stratum of conditioner, but desirably has a relatively absorbent image bearing surface which is covered by and placed in intimate contact with the conversion sheet coating. While thus disposed, the contacting surfaces are irradiated by infrared radiation for a predetermined period of time to vaporize the conditioner from areas of the coating corresponding spatially and dimensionally to those of the subject which contain infrared absorbent material and effect the transfer of such conditioner to the subject.

At this stage in any of the three aforementioned specific method aspects, the subject and conversion sheet are spearated, and clearant is applied to the conversion sheet coating, as by swabbing with a soft material, to effect disruption of the coating areas containing conditioner and removal thereof from the base sheet, while leaving the remaining areas of the coating substantially unchanged. This, in each instance, leaves on the conversion sheet a reproduced image which conforms to the subject image.

Having thus described various aspects and steps of the preferred method of this invention, more specific and definite examples adapted to use in carrying the method into effect will now be set forth.

*Example 1*

This example is illustrative of a preferred embodiment of this invention and affords a detailed recitation of a manner for carrying the method of the chart of FIG. 4 into effect from a subject, such as either A or B, through the steps illustrated and described as steps F, J and O to produce one of the finished and usuable conversion sheets bearing an image of the type depicted in FIGS. 1 or 2 as C, D or E. It may be understood that such a finished image bearing conversion sheet is an accurate reproduction of the original image produced without photography, and which is adapted to the preparation of, for example, a lithographic printing plate by providing a negative for contact printing upon a lithographic plate coating in the conventional manner.

As described in connection with step F, a sheet 30 of short-fiber paper about 0.001" thick was provided with a surface coating 32 of black-pigmented ink applied by a conventional pritning process. On its opposite surface the sheet 30 was provided with a uniform and continuous coating 33 of a solution comprising, by weight, 10% of salicylic acid which serves as a coating conditioner, and 90% isopropyl alcohol. Upon evaporation of the alcohol, salicylic acid adhered to the paper in a film-like layer of very finely divided and cohesive particles.

The paper thus prepared was used as a charge sheet from which the salicylic acid conditioner was transferred to the image bearing surface of the subject by irradiating the black ink surface thereof with infrared radiation while the salicylic acid conditioner bearing surface was in intimate contact with the image bearing surface of the subject. The heat produced by only very short irradiation was sufficient to sublime or vaporize the salicylic acid conditioner from the charge sheet surface and effect its transfer to the image bearing surface of the subject. The thus vaporized and transferred salicylic acid conditioner condensed on the subject surface, upon cooling, to form a substantially continuous and uniform stratum thereof upon the image bearing subject surface. The condensed stratum of salicylic acid conditioner was practically invisible upon the surface of the subject and was adapted to the transmission of infrared radiation.

The conversion sheet utilized with the aforementioned conditioner consisted of a Du Pont Type D Mylar polyester sheet, about 0.003" in thickness. It was uniformly machine coated by a gravure cylinder with an extremely thin coating of from about 0.005 to about 0.0001 ounce of coating components per square foot of the base sheet surface. The coating consisted, by weight, of 16.2% ethyl cellulose, which was 7 centipoise, standard ethoxy Ethocel, as produced by Dow Chemical Co., Midland, Michigan; 16.2% of a 64% of petroleum distillate solution of a sodium salt of lauryl sulfate ester, which was Triton GR–7, available from Rohm & Haas Co., Philadelphia 5, Pennsylvania; 5.4% of 4-methyl-7-diethylamino coumarin; 5.4% of 2,2',4,4' tetrahydroxybenzophenone; 8.2% of a mixture of tetrasubstituted benzophenones including 2,2' dihydroxy-4,4' dimethroxybenzophenone, available as "Univul 490" from Antara Chemicals Co., (the latter two being ultraviolet light absorbers); and dyes including 21.6% Azosol Fast Red BE, 21.6% Orasol Yellow 3R, 5.4% Acetosol Blue RLS. The Azosol Fast Red BE is available from Antara Chemicals Co. of New York City and is identified as Colour Index, Solvent Red 8, No. 12715. Orasol Yellow 3R is produced by Ciba Co. of New York City and is identified as Colour Index, Solvent Yellow 25. Acetosol Blue RLS is available from Sandoz Chemical Works, Inc., New York 13, New York, and is identified by the Colour Index as Solvent Blue 47. The coating deposited on the base sheet adhered thereto and was transparent to the eye and a deep ruby red color.

This conversion sheet 27 was placed with the coating surface thereof in intimate contact with the image bearing surface of the subject, as shown in step J of FIG. 4. With the conversion sheet and subject thus disposed and in contact, the conditioner charged subject was irradiated with infrared radiation directed through the base sheet and coating. Irradiation was effected by passage through a Thermo-Fax copying machine Model 47. Since the base sheet, the coating thereon and the stratum of salicylic acid on the subject surface all transmit infrared radiation, the radiation reached infrared absorbent areas of the image bearing surface of the subject developed sufficient heat therein to again sublime or vaporize the salicylic acid from the heated areas to effect its transfer to corresponding spatially and dimensionally related areas of the adjacent conversion sheet coating. Since the remaining areas of the image bearing surface of the subject were substantially non-absorbent of infrared radiation, they remained relatively cool and the salicylic acid thereon was not vaporized or transferred to the conversion sheet coating. The vaporized salicylic acid penetrated portions of the conversion sheet coating to render those portions disruptable and removable from the base sheet.

After separation of the conversion sheet from the subject, the areas of the coating penetrated by the salicylic acid were removed from the base sheet without appreciably changing the contiguous areas of the coating by swabbing the entire surface of the coating with an absorbent cloth or tissue impregnated with a clearant consisting of three volumes of 1,1,1,-trichloroethane mixed with one volume of a naphtha cut having a boiling range of 315° to 350° F. and an aromatic content of 3.7% or less, by volume. Such a cut is available under the trade designation "Shell Sol 360" from Shell Oil Company of New York, New York. The clearant and light friction from the swabbing application thereof readily removed the salicylic acid conditioner penetrated portions of the coating while the remainder of the coating was substantially unaffected. The resultant conversion sheet to which the image was thus transferred consisted of clear sharply-defined light-transmitting areas corresponding to the infrared absorbing image areas of the original subject and additional contiguous area of an orange-colored film coating.

When, for example, the infrared absorbent areas of the subject produce a negative image of the subject on the conversion sheet, such a conversion sheet negative may be used in a manner similar to a conventional photographic negative, for the exposure of a lithographic plate to be subsequently processed and mounted on a lithographic or offset press for printing reproductions of the original subject. The red color of the negative is sufficiently opaque in the wavelength range to which light-sensitive lithographic plate coatings are normally responsive (340–500 millicrons) so that in all essential respects, the conversion sheet negative is the full functional and manipulative equivalent of a conventional photographic negative. Such a conversion sheet negative is also adapted for use to expose a conventional photoengraving plate coating which is sensitive to high-range ultraviolet and low-range visible light. In this instance, however, the photoengraving plate is exposed with the coating side of the negative away from the plate, so as to produce a laterally reversed image which is required for relief or letterpress printing.

As an alternative equivalent for the salicylic acid conditioner, it has been found that glycerol may be used. Glycerol is coated on the uninked surface of the charge sheet from a 6% to 10% solution, by volume, in isopropyl alcohol. Although a slightly longer period of irradiation is required for the vaporization of glycerol than that required for salicylic acid, the conversion sheet is processed in the same manner and with the same materials as those used with the salicycylic acid conditioner.

*Example 2*

This example is the same as Example 1, except that in place of the back-pigmented ink which was used as a coating on the charge sheet of Example 1, the charge sheet for Example 2 is coated with a non-black infrared absorbing material, such as a copper salt, to serve in converting infrared radiation to heat.

The following formula provides a satisfactory copper salt coating:

| | | |
|---|---|---|
| Water | ml.__ | 60 |
| Ethanol | ml.__ | 10 |
| 2-ethoxyethanol | ml.__ | 30 |
| Cupric ammonium chloride | gm.__ | 15 |

This solution was brush applied to a paper base sheet having a thickness of about 0.001″, and after drying, the opposite surface was covered with the salicyclic acid coating as set forth in Example 1.

Although slightly less heat is developed in the layer of copper salt, a somewhat longer irradation time produces results which are fully equivalent to those obtained with the black ink coating. The yellowish cast in the cupric ammonium chloride coating, being less opaque, visually, than the black-pigmented ink, offers the advantage of visibility for positioning small sections of charge sheet over some subjects wherefrom only preselected portions are to be reproduced.

*Example 3*

While the conditioner is transferred to the image bearing surface of the subject in accordance with step F in FIG. 4 in Examples 1 and 2, this example affords a somewhat different manner of transferring conditioner to the subject, in accordance with step G of FIG. 4. In this example, the heating of the charge sheet to effect the sublimation or vaporization of the conditioner and its transfer to the image bearing surface of the subject is accomplished on a flat-bed warming platen, rather than by infrared radiation. Thus, no infrared absorbent coating is required on one surface of the charge sheet.

In this instance, a relatively thick and porous sheet of paper is impregnated with a 10% solution of salicyclic acid in isopropyl alcohol. Upon evaporation of the alcohol, the sheet is ready for use and is placed in intimate contact with the image bearing surface of the subject which is to be reproduced. Either face of the charge sheet may be used. While in inimate contact with the image bearing surface of the subject, the charge sheet is desirably held in contact with the subject by a surface, such as a sheet of glass, and the sheet and subject thus disposed are heated for approximately 30 seconds on a flat-bed warming platen having a surface temperature of approximately 180° F. In this manner, the salicyclic acid conditioner is vaporized from the charge sheet and is transferred to the image bearing surface of the subject, whereupon the subject is prepared for use in the manner described in Example 1.

*Example 4*

As another expedient for effecting the deposit of a relatively uniform and continuous coating of a conditioner on the image bearing surface of a subject for use in connection with the herein disclosed method, salicylic acid was ground to a particle size that would pass through a 100-mesh screen. This powdered salicyclic acid is used in accordance with step H of the chart of FIG. 4. For the use of this method of applying the conditioner to the subject, the subject may, for example, constitute black typewritten text providing image areas on a non-gloss paper. The conditioner is applied to the image bearing surface of the subject by charging a wide flat brush with the powdered salicyclic acid and brushing this over the entire image bearing surface. The powder is retained in the microscopically rough non-gloss surface of the subject, after which the image bearing surface may be wiped with a clean tissue to further distribute the finely divided salicylic acid on the surface. After being thus prepared, the subject is used in the same manner as that set forth in Example 1.

*Example 5*

Example 5 makes use of the manner of application of conditioner to the image bearing surface of the subject which is indicated in step I of FIG. 4, wherein the subject image is on white paper. The image bearing surface of the subject is sprayed over its entire area with a composition comprising, by volume, 95% isopropyl alcohol mixed with 5% glycerol. In this instance, glycerol acts as the coating conditioner. Upon evaporation of the volatile alcohol, the subject is ready for use, and may be utilized in the same manner as that set forth in Example 1.

*Example 6*

This example embodies an application of conditioner to the subject in the manner indicated in step I of FIG. 4, and as set forth in Example 5. However, the treated subject having the conditioner applied thereto is processed in a manner different than those thus far described, and as indicated in step K of FIG. 4.

Specifically, in this example, a subject on white paper was sprayed over its entire image bearing surface area with a composition comprising, by volume, 92% isopropyl alcohol mixed with 8% glycerol. As in Example 5, glycerol serves as the coating conditioner. Upon evaporation of the volatile alcohol, the glycerol-coated subject was placed in contact with a porous sheet of infrared-transmitting paper having a thickness of approximately 0.001″. The paper sheet serves as a discharge sheet into which glycerol is discharged by vaporization from image defining areas of the subject which contain an absorbent of infrared radiation. To accomplish the disposition of glycerol from the areas of the subject containing an infrared absorbent material, the subject was irradiated by passage through a Thermo-Fax copying machine for an exposure of approximately 1/10 second. That source of radiation passes infrared energy through the infrared transmitting paper which was in contact with the glycerol bearing surface of the subject. Such infrared radiation transmitted by the discharge sheet to the underlying infrared absorbing image areas of the subject was sufficient to vaporize the major portion of the glycerol from the infrared absorbent areas of the subject and effect its transfer to the discharge sheet. In many instances, the infrared absorbing material, such as printer's ink or typewriter ribbon ink, tends to hold glycerol on or near the surface of the subject, from which position the glycerol is more readily vaporizable from the image areas than from the background areas wherein the glycerol penetrates to a greater depth. By such treatment, substantially all of the glycerol is vaporized from the subject areas containing the infrared absorbent material, while substantially all of the applied glycerol remains in the other areas of the subject.

Following the irradiation and the transfer of the glycerol conditioner to the discharge sheet, that discharge sheet was removed from the subject and the subject was placed in face-to-face contact with the coating of a conversion sheet of the type described in Example 1. The conversion sheet coating is desirably held in intimate contact with the image bearing surface of the subject by being placed under glass and then put upon a flat-surface heating platen for heating to a temperature of approximately 145° F. for a period of approximately 60 seconds. During this time, the glycerol which remains in the areas of the subject surface not containing an infrared absorbent material is vaporized from the subject and transferred to the conversion sheet coating to penetrate and commingle with that coating in areas spatially and dimensionally corresponding to those of the subject.

The glycerol-penetrated portions of the converison sheet coating are then cleared in the same manner as that described in Example 1. It may be observed that with like subjects, the method embodying the steps of this example will produce a positive image, while the steps of Example 1 would produce a negative image.

*Example 7*

This example relates to the modification of the method of this invention which is schematically illustrated in FIG. 5 of the drawings, and comprehends the use of a conversion sheet wherein a vaporizable conditioner was incorporated in the coating of the conversion sheet when that sheet was manufactured. In use, then, the characteristics of areas of the conversion sheet coating are differentiated from one another by the vaporization of conditioner from the coating in image delineating areas, while leaving the conditioner in the contiguous coating areas.

A conversion sheet adapted to use in the method of this example was prepared by utilizing a .003" polyester base sheet of transparent DuPont Mylar, Type D. An etched or knurled gravure cylinder was used to apply to one surface of the base sheet a uniform coating which was constituted as follows: A solvent mixture was made of equal volumes of methanol, isopropanol, butanol and ethylene glycol monoethyl ether. In this solvent mixture, the following non-volatile constituents are:

| Ingredient | Percent By Wt. | Function |
|---|---|---|
| Ethyl cellulose | 17.2 | Synthetic resin. |
| 4-methyl-7-diethylamino coumarin | 5.7 | Ultraviolet absorbers. |
| 2,2',4,4'-tetrahydroxy benzophenone | 5.7 | |
| 2,2'-dihydroxy-4,4'-dimethoxy benzophenone | 8.5 | |
| Azosol Fast Red BE | 22.9 | Dyes. |
| Orasol Yellow 3R | 22.9 | |
| Acetosol Blue RLS | 5.7 | |
| Diethanolamine | 11.4 | Conditioner. |

The ethyl cellulose used is 7 centipoise viscosity, standard ethoxy Ethocel, as produced by Dow Chemical Co., Midland, Michigan. The ultraviolet absorber, 2,2' dihydroxy-4,4' dimethoxy benzophenone is the principal ingredient of a mixture of tetrasubstituted benzophenones, available as "Univul 490" from Antara Chemicals Co. of New York City. Azosol Fast Red BE is produced by Antara Chemicals Co. of New York City and is identified as Colour Index, Solvent Red 8, No. 12715. Orasol Yellow 3R is produced by Ciba Co. of New York City and is identified as Colour Index, Solvent Yellow, 25. Acetosol Blue RLS is produced by Sandoz Chemical Works, Inc. of New York City and is identified as Colour Index, Solvent Blue, 47.

The Colour Index, Second Edition 1956, is a compilation by the American Association of Textile Chemists and Colorists and the Society of Dyers and Colourists of England to identify recognized commercially available coloring materials.

The ratio of coating components to solvent mixture was adjusted to deposit the coating components in a self-levelling, rapidly drying coating which, after evaporation of the solvent mixture, produced an extremely thin film coating of from about 0.005 to about 0.0001 ounce of coating components per square foot of base sheet surface, and which coating adhered to that base sheet surface. A suitable ratio of coating components to solvent mixture is, for example, approximately 40 grams of coating components to approximately 100 ml. of solvent mixture. The coating is visibly transparent, but has a deep orange color.

As shown in step M of FIG. 5, the coating of the conversion sheet made as set forth in this example was placed in face-to-face contact with the image bearing surface of a subject. In this instance, a subject on white paper and having infrared absorbent material contained in the image delineating areas thereof was utilized. While the conversion sheet coating was in intimate contact with the image bearing surface of the subject, the subject surface was irradiated to infrared radiation directed through the base sheet and the coating. Infrared radiation was readily transmitted by both the base sheet and the coating to the image delineating areas containing the infrared absorbent material, so that the infrared radiation was converted to sufficient heat to vaporize a major portion of the diethanolamine from areas of the coating which correspond spatially and dimensionally to the image delineating areas of the subject which contain the infrared absorbent material. As in previously described instances, a Thermo-Fax Model 47 copying machine provides a convenient source of infrared radiation.

The substantial elimination of the vaporizable conditioner, diethanolamine, from the conversion sheet coating affects the characteristics of the areas of the coating from which it is removed to render those portions resistant to the action of the clearant, while the portions in which the conditioner remains are disruptable and removable from the base sheet by swabbing with the clearant. Thus, when infrared absorbent material is contained in the image delineating portions of the subject, conditioner is discharged from corresponding portions of the conversion sheet and a positive image results from a subject which would produce a negative image if treated by the method step of step J in the method of FIG. 4.

With the conversion sheet coating and conditioner set forth in this example, the clearing action is accomplished by swabbing the coating surface with the aid of a clearant consisting of two volumes of methylene chloride and three volumes of xylene. The uses of the completed conversion sheet, for this example, are like those of the preceding examples herein set forth.

*Example 8*

This example is concerned with production of a mask to facilitate halftone reproduction of subjects of the type illustrated diagrammatically in the drawings as subject B, wherein the subject embodies areas or segments reproducible with and without dot pattern, and where the subject and image areas may embody a combination of halftone and line or clear highlight areas.

In the photomechanical steps of producing a halftone negative for the printed reproduction of subjects wherein, for example, an illustration in various shades of gray is combined with black lines or type, it is generally required that the gray tone areas shall be reproduced with a dotted halftone screen pattern, while the line or type areas are reproduced without screen pattern. Printing plates for this purpose are commonly referred to as "combination line and halftone plates." Conventionally, such plates are produced by making one negative through a halftone screen and another without a screen; the gray tone areas of the screen negative are then cut and adhered into corresponding sections that have been cut away from the unscreened negative to produce the required combination.

Through the use of a conversion sheet and a method of the types herein disclosed, such a combination may be quite quickly and inexpensively made on a single negative. This is done by using a conversion sheet having a reddish colored coating which serves as a mask or cover for line or type areas on the original subject, while the shaded gray areas of the subject which require halftone reproduction are behind the cleared areas of the mask and are photographed therethrough.

To exemplify this example, a water color wash drawing, such as that indicated by segments 20, 22, 23 and 24 of the subject B, may be rendered with a conventional carbon black or bone black pigmented water color or water-miscible drawing ink. However, for accomplishing the purposes of this method, instead of using water for thinning the color to produce the various shades of gray, a 15%, by weight, aqueous solution of cupric ammonium chloride is used. This makes all of the gray wash areas absorptive of infrared radiation, by virtue of the inclusion of the copper salt. The addition of 2% of an ultraviolet absorbent material, such as 4,4′-diamino-2,2′-disulfostilbene, conditions the subject for ultimate use of the process described in United States Letters Patent No. 2,191,939, issued to Walter S. Marx, Jr. on February 27, 1940.

Black areas or pen lines, exemplified by areas 18 and 19 of subject B, which are either within or adjacent the gray wash areas are produced with a visually black ink which is essentially non-absorptive of infrared radiation. As an example, such black ink comprises a 10% aqueous solution of a trisazo dye marketed by Antara Chemicals Co. of New York City as "Direct Deep Black EA Ex Conc CF," and identified as Colour Index Direct Black 38, No. 30235.

The subject prepared as set forth in this example is then processed in the manner described in Example 1 for the production of a conversion sheet negative suitable for its intended use as a mask.

The use of such a mask is well known in the art of photoengraving to prevent photography of linework or type, adjacent to or interspersed with art rendering in gray shades, during a halftone exposure to record the various shades of gray in terms of correspondingly varied sizes of halftone dots. During an unscreened exposure subsequently made to record said linework or type without a screen pattern, the conversion sheet mask is removed. During the unscreened exposure to record the linework and type, and when an ultraviolet-absorbing material is included in the artist's wash medium, the ultraviolet-absorbing gray areas of the artwork (as well as black lines and type) are self masked (non-photographic) when that exposure is made by ultraviolet light only.

The resulting negative is normally referred to as a "combination line and halftone negative" inasmuch as various shades of gray in the original art rendering are reproduced by a screened halftone dot pattern, and the line or type areas are produced free of screen pattern, as is also the white background behind the line or type areas or both.

The foregoing examples are set forth herein to provide clear and definite illustrations of various steps and the manners of producing the instrumentalities utilized therein for carrying this method into effect, and are not intended, in any way, to limit the scope of this invention.

From the foregoing description, including the specifically set forth examples, and by reference to the accompanying drawings, it may be understood that by this invention, we have provided a distinctive and improved method by which delineated image areas of a subject are differentiated and rendered distinctive from other areas of the subject, and whereby such delineated image areas can be transferred in sharply and clearly defined form and in spatial and dimensional conformity to a conversion sheet useful in graphic reproduction in a very short period of time without the aid of photography or the darkroom development procedures or the skills associated therewith. By this method, both negative and positive image reproductions are readily obtainable with high fidelity of reproduction. Being a rapid method subject to being carried out by relatively unskilled operators with relatively inexpensive equipment and materials, the method has economic and time-saving advantages.

Having thus described our invention, what is claimed is:

1. In the graphic arts, a method of making a reproducible image of a subject which includes image delineating areas as one type and additional areas contiguous thereto as another type, which types of areas are distinguished in said subject by the presence in one of the types of areas of infrared absorbent material while the other is relatively non-absorptive of infrared radiation, and by the cooperation therewith of a conversion sheet including a base sheet having thereon a physically disruptable coating which contrasts visibly and light transmissively with the base sheet, a vaporizable coating conditioner which changes the physical characteristics of said coating to render the portions thereof which are treated by the conditioner sharply separable from contiguous coating portions and removable from the base sheet and a clearant which facilitates the disruption and removal of the conditioner treated portions of the coatings, said method comprising the steps of applying a relatively uniform stratum of a vaporizable coating conditioner to both the image delineating and additional areas of the subject, placing the physically disruptable coating of the conversion sheet in close contact with the surface of the subject which includes the image delineating and additional areas, exposing the contacting surfaces of the coated conversion sheet and subject to infrared radiation for a predetermined period for effecting selective vaporization of conditioner from the subject areas containing infrared absorbing material and the transfer of such conditioner to the physically disruptable coating of the conversion sheet in areas corresponding spatially and dimensionally to those of the subject which contain infrared absorbing material, separating the subject and conversion sheet, and applying clearant to the conversion sheet coating to effect the physical disruption and removal from the base sheet of the coating areas to which conditioner was transferred.

2. The method of making a reproducible image as defined in claim 1, and wherein the application of the relatively uniform stratum of a vaporizable coating conditioner to the image delineating and additional areas of the subject is effected by placing against the surface of the subject having said image delineating and additional areas thereon a sheet of material which is charged with the vaporizable conditioner, and applying heat thereto to effect vaporization of the conditioner and transfer thereof to the subject.

3. The method of making a reproducible image as defined in claim 1, and wherein the application of the relatively uniform stratum of a vaporizable coating conditioner to the image delineating and additional areas of the subject is effected by spraying said conditioner onto the subject.

4. The method of making a reproducible image as defined in claim 1, and wherein the application of the relatively uniform stratum of vaporizable coating conditioner to the image delineating and additional areas of the subject is effected by dusting vaporizable conditioner in finely divided dry form onto the surface of the subject and spreading it into a relatively uniform thin layer.

5. The method of making a reproducible image as defined in claim 1, and wherein the application of the relatively uniform stratum of a vaporizable coating conditioner to the image delineating and additional areas of the subject is effected by placing against the surface of the subject having said image delineating and additional areas thereon a sheet of material which carries a distributed charge of the vaporizable conditioner and which has on the surface opposite the subject a relatively uniform layer of an infrared absorbent material, and irradiating the infrared absorbent layer of said sheet with infrared radiation to effect vaporization of the conditioner and the transfer thereof to the subject.

6. In the graphic arts, a method of making a reproducible image of a subject which includes image delineating areas as one type and additional areas contiguous thereto as another type, which types of areas are distinguished in said subject by the presence in one of the types of areas of infrared absorbent material while the other is relatively non-absorptive of infrared radiation, and by the cooperation therewith of a conversion sheet having a physically disruptable coating on a base sheet, a vaporizable coating conditioner which changes the physical characteristics of said coating to render the portions thereof which are treated by the conditioner physically disruptable and sharply separable from contiguous coating portions and removable from the base sheet, and a clearant which facilitates the disruption and removal of the conditioner treated portions of the coating, said method comprising the steps of applying a relatively uniform stratum of a vaporizable coating conditioner to both the image delineating and additional areas of the subject, exposing the said image delineating and additional areas of the subject for a predetermined period of time to infrared radiation for effecting selective vaporization of practically all of the vaporizable conditioner from the subject areas containing infrared absorbing material while leaving a substantial quantity of the vaporizable conditioner in the areas of the subject which are relatively non-absorptive of infrared radiation, placing the physically disruptable coating of the conversion sheet in close contact with the surface of the subject which includes the image delineating and additional areas, generally heating the contacting surfaces of the subject and conversion sheet to effect vaporization of the vaporizable conditioner from the areas of the subject which are relatively non-absorptive of infrared radiation and the transfer of such conditioner to the physically disruptable coating of the conversion sheet in areas corresponding dimensionally and spatially to those of the subject which are relatively non-absorptive of infrared radiation, separating the subject and conversion sheet, and applying clearant to the conversion sheet coating to effect sharp separation of conditioner treated areas of the coating from other areas thereof and removal from the base sheet of the coating areas to which conditioner was transferred.

7. The method of making a reproducible image as defined in claim 6, and wherein the application of the relatively uniform stratum of vaporizable coating conditioner to the image delineating and additional areas of the subject is effected by placing against the surface of the subject having said image delineating and additional areas thereon a sheet of material which carries a distributed charge of the vaporizable conditioner and which has on the surface opposite the subject a relatively uniform layer of an infrared absorbent material, and irradiating the infrared absorbent layer of said sheet with infrared radiation to effect vaporization of the conditioner and the transfer thereof to the subject.

8. The method of making a reproducible image as defined in claim 6, and wherein the application of the relatively uniform stratum of vaporizable coating conditioner to the image delineating and additional areas of the subject is effected by placing against the surface of the subject having said image delineating and additional areas thereon a sheet of material which carries a distributed charge of the vaporizable conditioner, and heating said sheet while in contact with the subject to effect vaporization of the conditioner and the transfer thereof to the subject.

9. The method of making a reproducible image as defined in claim 6, and wherein the application of the relatively uniform stratum of a vaporizable coating conditioner to the image delineating and additional areas of the subject is effected by spraying said conditioner onto the subject.

10. The method of making a reproducible image as defined in claim 6, and wherein the application of the relatively uniform stratum of a vaporizable coating conditioner to the image delineating and additional areas of the subject is effected by dusting vaporizable conditioner in finely divided dry form onto the surface of the subject and spreading it into a relatively uniform thin layer.

11. In the graphic arts, the method of effecting the transfer from a surface of a subject to a pre-established physically disruptable surface coating on a conversion sheet of a spatial and dimensional mask for one segment of a delineated image which includes segments differentiated from each other by requiring halftone and non-halftone reproduction when said surface of the subject embodies a vaporizable conditioner which, by its presence in any portion of the conversion sheet coating, determines the physical characteristics of that portion of the coating to render it removable from the conversion sheet and physically separable from contiguous portions not having conditioner therein, which method comprises the steps of distinguishing said one segment of the delineated image from the rest of the subject by the inclusion in said one segment of a material absorbent of infrared radiation while the rest of the subject is practically non-absorptive of infrared radiation, placing the surface of the subject having the delineated image thereon in intimate contact with the surface coating of the conversion sheet, irradiating the contacting surfaces of the subject and conversion sheet with infrared radiation for a predetermined period of time to effect vaporization of the vaporizable conditioner from areas of the subject corresponding spatially and dimensionally to those of the subject which include the infrared absorbent and the transfer thereof to corresponding image delineating areas of the opposed contacting surface coating to effect alteration of the physical characteristics of said image delineating areas of the coating so as to distinguish the physical characteristics thereof from other areas of the coating, whereupon said image delineating areas of the coating are disruptable and removable from the conversion sheet, separating the subject and conversion sheet, and removing from the conversion sheet the portions of the coating to which conditioner has been transferred from the surface of the subject by the irradiation.

12. The method of effecting the transfer of a delineated image as defined in claim 11, and wherein said removal from the conversion sheet of the portions of the coating which are physically separable from other coating portions is effected by the application thereto of a clearant which coacts with only the portions of the coating which contain the conditioner transferred thereto from the subject by the irradiation.

13. In the graphic arts, the method of effecting the transfer from a surface of a subject to a pre-established physically disruptable surface coating on a conversion sheet of a spatial and dimensional mask for one segment of a delineated image which includes segments differentiated from each other by requiring halftone and non-halftone reproduction when said coating surface embodies a vaporizable conditioner which, by its presence in any portion of the coating, determines the physical characteristics of that portion of the coating to render it removable from the conversion sheet and physically separable from contiguous portions not having conditioner therein, which method comprises the steps of distinguishing said one segment of the delineated image from the rest of the subject by the inclusion in said one segment of a material absorbent of infrared radiation while the rest of the subject is practically non-absorptive of infrared radiation, placing the surface of the subject having the delineated image thereon in intimate contact with the surface coating of the conversion sheet, irradiating the contacting surfaces of the subject and conversion sheet with infrared radiation for a predetermined period of time to effect vaporization of the vaporizable conditioner from areas of the coating corresponding spatially and dimensionally to said one segment of the subject which includes the infrared absorbent and the transfer thereof to said one segment of the opposed surface of the subject to effect alteration of the physical characteristics of an image delineating area of the coating so as to distinguish the physical characteristics thereof from other areas of the coating, whereupon areas of the coating other than said image delineating area contain conditioner and are disruptable and removable from the conversion sheet, then separating the subject and conversion sheet, and removing from the conversion sheet the areas of the coating which are separable from other coating portions and removable after the vaporization and transfer of said conditioner from said image delineating areas of the coating.

14. The method of effecting the transfer of a delineated image as defined in claim 13, and wherein said removing from the conversion sheet of the portions of the coating other than said image delineating area is effected by the application to the coating of a clearant which coacts with only the areas of the coating which contain conditioner after the irradiation.

15. In the graphic arts, the method of effecting the transfer of a delineated image from a surface of a subject to a physically disruptable surface coating on a conversion sheet when said surface of the subject embodies a vaporizable conditioner which, by its presence in any portion of the coating, renders that portion of the coating physically disruptable and separable from contiguous coating portions not having conditioner therein and removable from the conversion sheet with the aid of a clearant, and in which method, the image delineating and other surface areas of the subject are rendered distinctive from each other by the inclusion in one of them of infrared absorbent material while the other is practically non-absorptive of infrared radiation, said method comprising the steps of placing the surface of the subject having the delineated image thereon in close contact with the physically disruptable surface coating of the conversion sheet, irradiating the contacting surfaces of the subject and conversion sheet with infrared radiation for a predetermined period of time to effect vaporization of the vaporizable conditioner from areas of the subject corresponding spatially and dimensionally to those subject areas including the infrared absorbent and the transfer of said vaporizable conditioner to the opposed contacting surface of the coating to effect a physical change in the physical characteristics of only the coating portions which are affected by the transfer of conditioner thereto, separating the subject and conversion sheet, and applying clearant to the coating of the conversion sheet to effect removal from the conversion sheet of the portions of the physically disruptable coating to which conditioner is transferred during the irradiation.

16. In the graphic arts, the method of effecting the transfer of a delineated image from a surface of a subject to a physically disruptable surface coating on a conversion sheet when said surface coating embodies a vaporizable conditioner which, by its presence in any portion of the coating, renders that portion of the coating physically disruptable and separable from contiguous coating portions not having conditioner therein and removable from the conversion sheet with the aid of a clearant, and in which method, the image delineating and other surface areas of the subject are rendered distinctive from each other by the inclusion in one of them of infrared absorbent material while the other is practically non-absorptive of infrared radiation, said method comprising the steps of placing the surface of the subject having the delineated image thereon in close contact with the physically disruptable surface coating of the conversion sheet, irradiating the contacting surfaces of the subject and conversion sheet with infrared radiation for a predetermined period of time to effect vaporization of the vaporizable conditioner from areas of the conversion sheet coating corresponding spatially and dimensionally to those subject areas including the infrared absorbent and the transfer of said vaporizable conditioner to the opposed contacting surface of the subject to effect a physical change in the physical characteristics of only the coating portions which are affected by the transfer of conditioner therefrom to the surface of the subject, separating the subject and conversion sheet, and applying clearant to the coating of the conversion sheet to effect removal from the conversion sheet of the portions of the physically disruptable coating which still contain conditioner after the vaporization and transfer of conditioner therefrom is effected by the aforesaid irradiation.

17. A method of infrared thermography which effects the transfer of a delineated image from a surface of a subject to a second vapor absorbent coating surface on a sheet of infrared penetrable material, which coating has physical characteristics that are determined by the presence therein of a vaporizable material, and which method comprises the steps of distinguishing delineated image areas and other areas of the subject by the inclusion in one of them of an absorbent of infrared radiation while the other of them is relatively non-absorbent of infrared radiation, applying to both kinds of said areas of the subject a vaporizable material adapted to coact with and change the physical characteristics of said second vapor absorbent coating surface, placing said surfaces in intimate contact with each other, irradiating the contacting surfaces with infrared radiation through said sheet of infrared penetrable material for a predetermined period of time to effect vaporization of said vaporizable material from the areas of the subject which include the infrared absorbent and the transfer thereof to areas of the second vapor absorbent coating surface which correspond spatially and dimensionally to the subject areas which include the infrared absorbent to change the characteristics of said vapor absorbent coating by rendering it disruptable in said areas to which the vaporizable material is transferred, and removing from said sheet said areas of the coating to which the vaporizable material has been transferred.

18. A method of infrared thermography which effects the transfer of a delineated image from a surface of a subject to a second surface of a physically disruptable coating on a base sheet of infrared permeable material and wherein said surface of the subject has distributed therein a vaporizable material which, when vaporized therefrom and transferred to said second surface while in contact therewith, changes the physical characteristics of said physically disruptable coating, which method comprises the steps of distinguishing delineated image areas of the subject from other areas thereof by the inclusion in one of them of a vapor-absorbent material which is also absorbent of infrared radiation while the other areas are relatively non-absorptive of infrared radiation, placing said surfaces of said subject and said physically disruptable coating in contact with each other, irradiating the contacting surfaces with infrared radiation passed through the infrared permeable material of said base sheet for a predetermined period of time to effect vaporization of said vaporizable material from said surface of the subject and the transfer thereof from said surface of the subject to said surface of the coating in image defining areas which correspond spatially and dimensionlly to those of the subject which include the infrared absorbent, thereby to change the physical characteristics of said image defining areas of the coating, and thereafter effecting removal from the base sheet of portions of said physically disruptable coating which spatially and dimensionally correspond to said infrared absorbent areas of the subject.

19. A method of infrared thermography which effects the transfer of a delineated image from a surface of a subject to a second surface of a physically disruptable coating on a base sheet of infrared permeable material and wherein said coating has distributed therein a vaporizable material which, when vaporized therefrom to said surface of the subject while in contact therewith, changes the physical characteristics of the portions of said physically disruptable coating from which it is transferred, which method comprises the steps of distinguishing delineated image areas of the subject from other areas thereof by the inclusion in one of them of a material which is absorbent of infrared radiation while the other areas are relatively non-absorptive of infrared radiation, placing the surfaces of said subject and said physically disruptable coating in contact with each other, irradiating the contacting surfaces with infrared radiation passed through said infrared permeable material of said base sheet for a predetermined period of time to effect vaporization of said vaporizable material from said coating and the transfer thereof from said coating surface to said surface of the subject in image defining areas which correspond spatially and dimensionally to those of the subject which include the infrared absorbent, thereby to change the physical characteristics of said image defining areas of the coating, and thereafter effecting removal from the base sheet all said physically disruptable coating from areas other than said image defining areas.

20. A method of infrared thermography which effects the transfer of delineated image areas from a surface of a subject to a second surface provided by a coating on a base sheet, which method comprises the steps of differentiating the delineated image areas from other areas of the subject by the inclusion in one of them of a material absorptive of infrared radiation, including in said surface of the subject a vaporizable material which, when present in areas of the second surface distinguishes the physical characteristics of said areas thereof with respect to other areas of the second surface to render the areas which include the vaporizable material sharply separable from said other areas of the second surface and removable from the base sheet, placing such surfaces in contact, and while in contact, irradiating the surfaces with infrared radiation to effect vaporization of said vaporizable material from areas of the subject surface corresponding spatially and dimensionally to those which originally included material absorptive of infrared radiation, and thereafter disrupting and removing from the base sheet the areas of the coating to which the vaporizable material has been transferred from the subject.

21. A method of infrared thermography which effects the transfer of delineated image areas from a surface of a subject to a second surface provided by a coating on a base sheet, which method comprises the steps of differentiating the delineated image areas from other areas of the subject by the inclusion in one of them of a material absorptive of infrared radiation, including in said coating on the base sheet a vaporizable material which, when present in areas of said coating distinguishes the physical characteristics of said areas thereof with respect to other areas of the coating to render the areas which include the vaporizable material sharply separable from said other areas of the coating and removable from the base sheet, placing said surfaces in contact, and while in contact, irradiating the surfaces with infrared radiation to effect vaporization of said vaporizable material from areas of the coating corresponding spatially and dimensionally to those of the subject which include material absorptive of infrared radiation, and thereafter disrupting and removing from the base sheet the areas of the coating which embody the vaporizable material after the irradiation and which are areas other than those corresponding spatially and dimensionally to those of the subject which include material absorptive of infrared radiation.

References Cited by the Examiner

UNITED STATES PATENTS

| | | | |
|---|---|---|---|
| 2,503,759 | 4/50 | Murray | 250—65 |
| 2,770,534 | 11/56 | Marx | 250—65 |
| 2,798,960 | 7/57 | Moncrieff-Yeates | 250—65 |
| 3,081,699 | 3/63 | Gulko | 250—65 |
| 3,121,650 | 2/64 | Meissner | 250—65 |

FOREIGN PATENTS

| | | |
|---|---|---|
| 60,431 | 2/61 | South Africa. |
| 137,036 | 3/61 | Russia. |

RALPH G. NILSON, *Primary Examiner.*